Aug. 19, 1952 W. D. ALLISON 2,607,609
SPRING SUSPENSION FOR MOTOR VEHICLES
Filed April 26, 1946 4 Sheets-Sheet 1

INVENTOR.
William D. Allison.
BY
Elmer Jamison Gray
ATTORNEY.

Aug. 19, 1952     W. D. ALLISON     2,607,609
SPRING SUSPENSION FOR MOTOR VEHICLES
Filed April 26, 1946     4 Sheets-Sheet 2
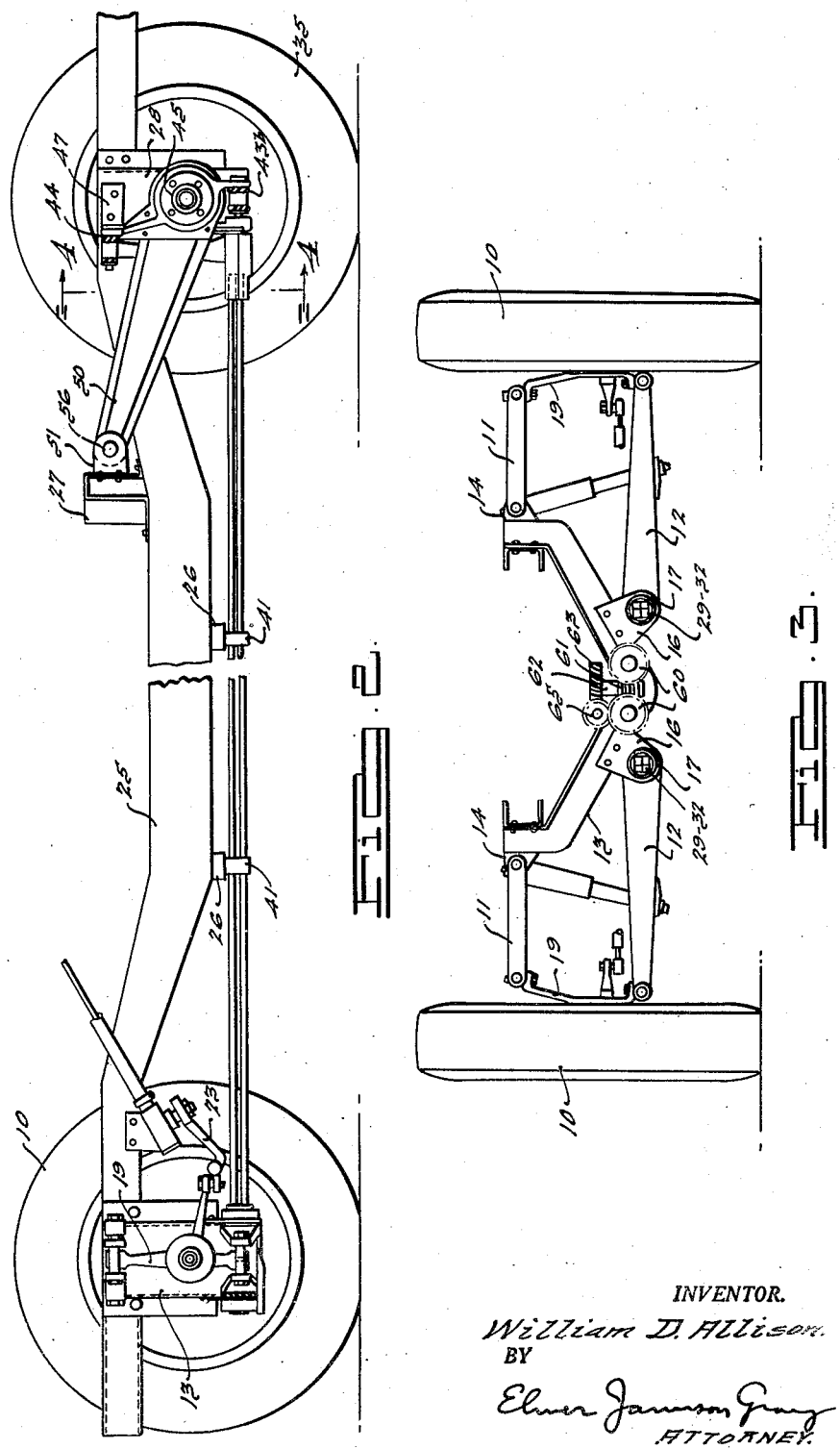
INVENTOR.
William D. Allison.
BY
Elmer Jamison Gray
ATTORNEY.

Aug. 19, 1952 W. D. ALLISON 2,607,609
SPRING SUSPENSION FOR MOTOR VEHICLES
Filed April 26, 1946 4 Sheets-Sheet 3

INVENTOR.
William D. Allison.
BY
Elmer Jamieson Gray
ATTORNEY.

Aug. 19, 1952   W. D. ALLISON   2,607,609
SPRING SUSPENSION FOR MOTOR VEHICLES
Filed April 26, 1946   4 Sheets-Sheet 4
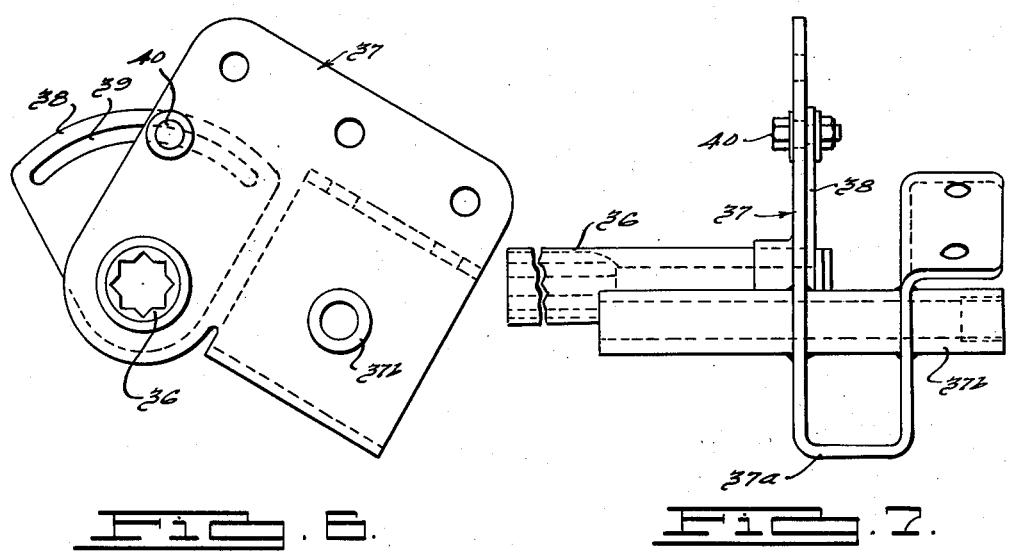
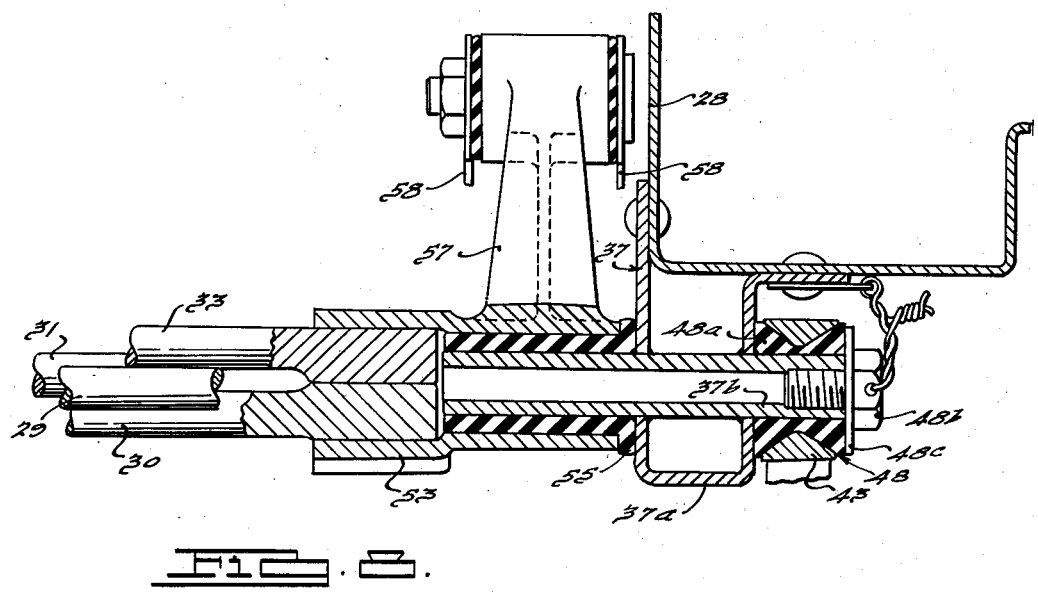
INVENTOR.
William D. Allison.
BY
Elmer Johnson Gray
ATTORNEY Patented Aug. 19, 1952

2,607,609

UNITED STATES PATENT OFFICE 2,607,609

SPRING SUSPENSION FOR MOTOR VEHICLES

William D. Allison, Detroit, Mich.

Application April 26, 1946, Serial No. 665,192

24 Claims. (Cl. 280—104)

This invention relates to motor vehicles and in particular to spring suspensions therefor. Although the present invention has been illustrated herein as embodied in an automobile of the pleasure or passenger type, it will be understood that the invention is equally applicable to other types of motor vehicles such as busses, trucks, ambulances and commercial vehicles.

One of the principal objects of the present invention is to provide a spring suspension for a motor vehicle capable of improving the riding characteristics of the vehicle, increasing the comfort of the driver and passengers especially when the vehicle travels over rough roads, and rendering the vehicle safer to handle over rough terrain while reducing materially serious stresses to which the frame is subjected in the use of motor vehicles, particularly those equipped with conventional spring suspensions.

Another important object of the invention is to provide a simplified and improved spring suspension especially advantageous for use in light cars, the invention enabling a light relatively cheap car to be produced which will have riding characteristics superior to those of conventional automobiles and which will enable the frame or body of the car to be maintained substantially level regardless of varying load conditions. The present spring suspension also has the important advantage of materially reducing or largely eliminating pitching and tossing of the vehicle and of greatly reducing body shake and vibration when the vehicle is travelling over rough roads.

Another object of the invention is to provide what may be termed a balanced spring suspension, preferably a torsional or torsion bar suspension common to the front and rear wheels of the vehicle at each side thereof, said suspension enabling much softer or lower rate springs to be utilized and being supplemented by spring means, preferably of the torsional kind, effective to vary the spring resistance at one end of the frame relative to the opposite end, means being provided for deflecting such spring means to compensate for relative changes in elevation of opposite ends of the frame due to variations in static load thereon. As a result of this feature of the invention it is possible to maintain the average effective riding height of the vehicle body substantially constant within the range of the load capacity of the springs regardless of whether the vehicle is empty or whether varying loads are carried thereby.

In accordance with the embodiment of the invention, herein illustrated by way of example, there is provided longitudinal torsional or torsion bar spring means connecting through the medium of front and rear lever arm means a pair of front and rear wheels at each side of the vehicle. The construction is such that the lever arm means for each front and rear wheel will torsionally deflect the spring means in opposed directions upon displacement of the wheels in corresponding vertical directions. Thus, when a front or rear wheel passes over a change in elevation, producing a raising or lowering effort at one end of the vehicle, a simultaneous and similar raising or lowering effort is applied at the opposite end of the vehicle. The action of the spring suspension, therefore, results in the simultaneous application of substantially equivalent vertical forces at opposite ends of the frame or body whenever the wheel or wheels at one end of the vehicle pass over a change in elevation. As a consequence, the vehicle rides substantially free of pitching and side sway. By thus providing spring means common to the front and rear wheels the suspension is what may be termed balanced, such suspension having the additional advantage of reducing greatly the spring rate at each wheel and affording increased riding comfort by producing the effect of very soft springs without the disadvantage consequent to their use in conventional spring suspensions.

Where the spring suspension is common to the front and rear wheels, as above described, a change in static or pay load at one end of the frame or body, such as the rear end, will effect a relative change in elevation of the front and rear of the frame. For example, the addition of passengers or baggage at the rear will lower the elevation of the rear of the frame and body and raise or elevate the front end. In accordance with the invention additional compensating spring means, preferably of the torsional or torsion bar kind, is provided at the rear or the front of the vehicle, or at both ends, for varying the spring resistance at one end of the vehicle relative to the opposite end. In addition, means is provided, such as power operated means, for independently deflecting the compensating spring means so as to compensate for relative changes in elevation of opposite ends of the frame and thereby levelize, or substantially so, the frame and cause the vehicle to ride substantially level, or at an even keel.

Another object of the invention is to provide means for increasing the resistance of the torsion bars to deflection or twisting proportionate to increases in the weight of the vehicle incident to load increases. In addition it is an object of the invention to provide improved yieldable stabilizer means associated with the torsion bar spring suspension but independently effective to resist changes in the normal riding height of either end of the vehicle, especially the front end, such as when accelerating quickly or when the brakes are applied hard or more or less suddenly.

A further object of the invention is to provide an improved rear wheel suspension for a motor vehicle embodying independently swinging wheel supports or arms for the rear wheels associated in improved manner with torque arms thereby achieving important advantages during operation of the vehicle, such as positive lateral and horizontal control of the rear wheels, minimum changes in tread width, application of upward forces to the rear of the body or chassis upon application of driving torque to the rear wheels, and vertical and horizontal displacement of the rear wheels when the latter pass over road obstacles.

Still a further object of the invention is to provide an independent rear wheel suspension having a torque arm associated with each rear wheel and pivotally attached to the vehicle body or frame at an elevation forward and above the axis of the road wheels, thus producing longitudinal horizontal movement of the wheel during vertical displacement thereof and enabling forces propelling the vehicle to be applied to the frame through the torque arms thereby causing a lifting effect on the rear of the vehicle and eliminating backward tilt common to conventional suspensions.

Other objects of this invention will appear in the following description and appended claims, reference being had to the accompanying drawings forming a part of this specification wherein like reference characters designate corresponding parts in the several views.

Fig. 2 is a side elevation of the structure shown in Fig. 1.

Fig. 3 is a front end elevation of the front wheel suspension mechanism.

Fig. 6 is a detail view of the bracket on the rear frame cross member to which the front end height adjusting torsion bar is connected.

Fig. 7 is an end elevation of the structure shown in Fig. 6.

Fig. 8 is an enlarged section taken through lines 8—8 of Fig. 4 looking in the direction of the arrows.

Figure 1:
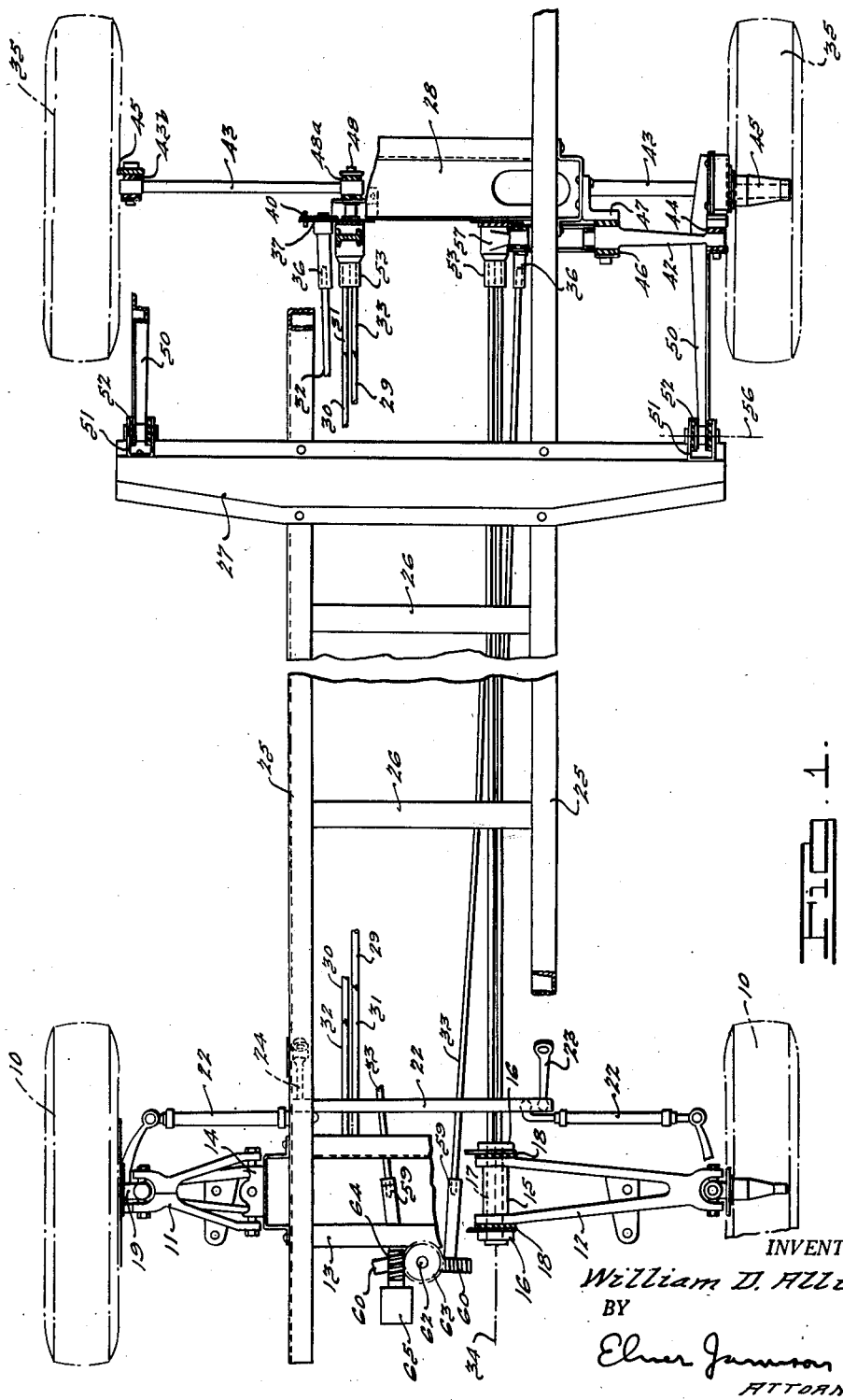
Fig. 1 is a fragmentary plan view of a motor vehicle chassis provided with a spring suspension constructed in accordance with one embodiment of the present invention.
Figure 4:
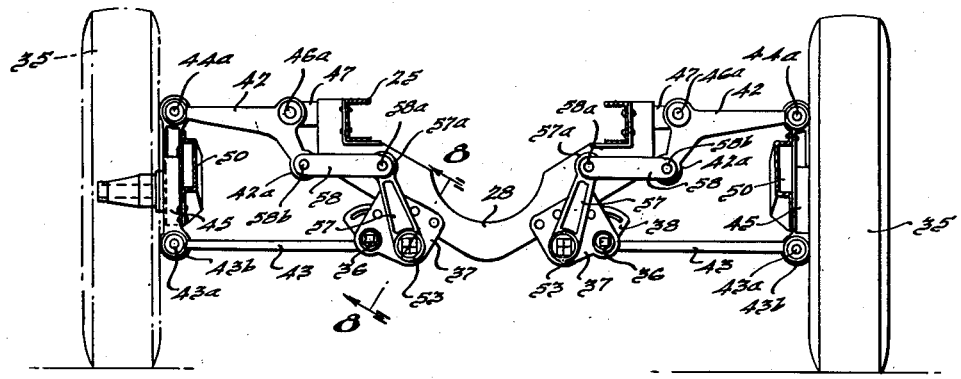
Fig. 4 is a view in elevation partly in section of the rear wheel suspension mechanism taken through lines 4—4 of Fig. 2 looking in the direction of the arrows.
Figure 5:
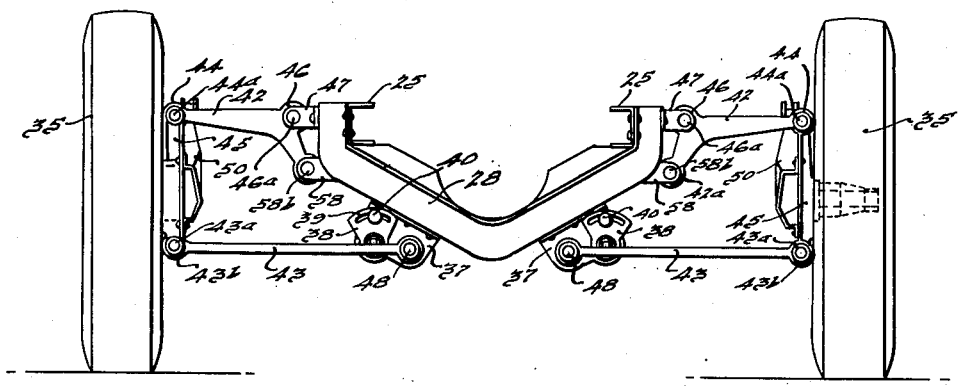
Fig. 5 is a view in elevation of the rear wheel suspension mechanism taken from the rear side thereof.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, a certain embodiment of the present invention as applied to a vehicle or automobile having pairs of front and rear wheels and a load carrying frame supported thereon through the medium of a spring suspension embodying the present invention. In the interest of clarity the vehicle superstructure or body, the power plant and power train have been omitted from the drawings. Although the front and rear wheels are shown as independently mounted through the medium of pairs of swinging suspension arms it will be understood that other types of wheel supports may be utilized without departing from the broader aspects of the invention. In this respect, therefore, the rear wheels or front wheels may be supported for vertical movement through the medium of any conventional types of axle means or supporting arms.

As illustrated in Figs. 1 and 3, each front wheel 10 is supported by upper and lower short and long suspension arms 11 and 12 of wishbone construction. The upper and lower suspension or lever arms 11 and 12 are mounted at right angles to the longitudinal axis of the vehicle for swinging movement in a substantially vertical plane and are joined together at their outer ends by a spindle and king pin mounting 19 of any conventional type to which the suspension arms 11 and 12 are pivoted at vertically spaced points. The inner bifurcated ends of each upper arm 11 are journalled through suitable bearings in a bracket 14 secured to a front frame cross member 13. The inner ends of each lower arm 12 embrace and are securely attached, as by welding, at spaced positions to a tubular section 15. Tubular section 15 extends through the arm ends to receive external bearings 18. The bearings 18 are preferably made of rubber and are secured in position by brackets 16 which are securely attached to frame cross member 13. Mounted in tubular section 15, preferably at or near its center, is a square socket 17 adapted to rigidly receive the square upset ends of a plurality of nested torsion bars.

Steering control is applied to the front wheels 10 through spindle and king pin mounting member 19 by a conventional tie rod and steering linkage consisting of tie rods 22, steering gear pitman arm 23, idler arm 24 and associated joints, bearings, and mountings.

The chassis frame shown in Figs. 1 and 2 consists mainly of longitudinal side sills 25, front cross member 13, intermediate cross members 26, a torque arm supporting cross member 27 and a rear cross member 28. The various members of the frame or body above named are securely attached together to form a suitable mounting for the component parts of the spring suspension.

The springs for the vehicle comprise two clusters or sets of torsion bars, one at each side of the chassis extending longitudinally thereof. Since, as shown in Fig. 1, the torsion bar spring means and associated parts are duplicated at each side of the vehicle, a description of one thereof will suffice.

In the embodiment shown, each set or cluster of spring torsion bars consists of five bars shown in Fig. 1 and designated by numerals 29, 30, 31, 32 and 33. The torsion bars are preferably of round spring steel stock with ends upset and formed square in cross-section. At the front of the vehicle four torsion bars 29, 30, 31 and 32 of each set are connected to each lower suspension arm 12, their formed ends being snugly nested in the squared socket 17.

The central axis of the cluster of bars 29, 30, 31 and 32 extends in line with the axis of swinging 34 of the wheel supporting arm 12. From the described construction it will be readily seen that swinging motion of each arm 12 about its axis 34 will produce a torsional or twisting action on the front ends of torsion bars 29, 30, 31 and 32. Thus, vertical movement of each front wheel 10 will be resisted by the torsional resistance of the associated cluster of spring torsion bars 29, 30, 31 and 32. Three of the four bars 29, 30 and 31 of each cluster fitted in socket 17 extend to the rear of the vehicle and are adapted by means herein later described to receive torsional deflection responsive to vertical movement of a rear wheel 35 in opposition to the torsional stress applied by a front wheel 10. On installation, bars 29, 30 and 31 are subjected to an initial deflection or twist calculated to apply a load to the front and rear wheel equivalent to a substantial part of the vehicle weight. The fourth bar 32 fitted at its front end in each socket 17 is a front end height adjusting bar and has its rear end secured to the vehicle frame by means of an adjustable socket 36 (Figs. 6 and 7) which may be locked in position when the desired torsional deflection is imparted to bar 32. In the embodiment shown in Figs. 1, 6, and 7, torsion bar 32 extends to the rear of the vehicle with its rear squared end fitted into socket member 36 having an eight point aperture which is adapted to receive a tool for imparting the desired torsional deflection to the bar 32. The socket member extends freely through a hole in a mounting bracket 37 and is anchored in a locking sector 38 in which an elongated arcuate slot 39 is provided and adapted to receive a locking bolt and nut 40. It is apparent that torsion bar 32 can thus be adjusted to the desired torsion in either direction and locked in position. Although this embodiment shows bar 32 of a length equal to bars 29, 30 and 31, it may be desirable to use a bar of shorter length with its rear end attached to an intermediate frame cross member 26 instead of rear frame cross member 28. The length of bar 32 for a given bar diameter materially effects the effective spring rate applied to the front wheel 10 by the combined torsional action of bars 29, 30, 31 and 32.

Intermediate the front and rear of the vehicle suitable torsion bar guides 41 are provided to prevent sagging of the torsion bars, maintain proper alignment and prevent rattles and undue chafing action. The guides 41 are preferably of rubber or resilient composition encased in a metal housing and constructed to hold the bars slightly separated and also permit slight torsional rotation of each bar.

In the present embodiment, the rear wheels 35 are each supported for independent vertical movement by means of upper and lower suspension or lever arms 42 and 43. The upper arms 42 are constructed in the form of bell cranks which are pivotally attached at 46a to brackets 47 through suitable flexible bearings 46, the brackets 47 being rigidly attached to the rear frame cross members 28. The lower arms 43 are pivotally attached at 48 through suitable flexible bearings 48a to a bracket assembly 37 which, in turn, is rigidly mounted on the rear cross member 28. The outer ends of the bell crank arms 42 are pivotally joined at 44a through flexible bearings 44 to the upper ends of rear wheel support and spindle members 45. The outer ends of the lower arms 43 are pivotally joined at 43a through flexible bearings 43b to the bottom ends of the rear wheel support and spindle members 45.

The flexible bearings 43b, 44, 46 and 48a are all similar in construction and a description of one will suffice for all. As illustrated in Fig. 8 the flexible bearing 48a is preferably formed of a tubular rubber-like material inserted within an opening at the inner end of each lower connecting arm or link 43 and interposed between the link and a tubular support 37b extending through the bracket assembly 37. A suitable retaining bolt and washer 48b and 48c is secured and locked at the end of the tubular support 37b to hold the bearing assembly in position. The above bearing construction permits a limited universal movement of the arm 43 in all directions on the tubular support 37b.

The bracket assembly 37, illustrated in Fig. 8, comprises a generally U-shaped sheet metal stamping 37a formed for convenient attachment to the rear frame cross member 28. The tubular support 37b is extended in a position parallel to the horizontal axis of the vehicle through the U-shaped stamping 37a and is securely attached thereto by welding.

It is apparent that on vertical displacement of either rear wheel 35, the lateral control exercised by the bell crank lever 42 and connecting arm or lever 43 is comparable to that applied by the front upper and lower suspension arms or levers 11 and 12 to the front wheels.

Referring to Figs. 1, 2, 4 and 5 there is illustrated a torque arm 50 rigidly attached at its rear end to each rear wheel and spindle support member 45. The forward end of each torque arm 50 is pivotally mounted in a bracket 51 by a flexible bearing 52 and a suitable retaining bolt forming the transverse axis of turning 56 of the torque arm. Bracket 51 is rigidly attached to frame cross member 27. As illustrated in Figs. 1 and 2 the torque arm fulcrum point or bearing 52 and axis 56 are above as well as forward of the axis of the rear wheel. Axis 56 of bearing 52 preferably lies in a common plane intersecting both the axis of the rear wheels and the center of gravity of the average sprung vehicle weight. The elevated position of the torque arm bearing axis 56 above the center of the wheel 35 is desirable for vehicles having power applied through the rear wheels and eliminates the backward pitch of the vehicle on acceleration by applying a vertical force as well as a forward thrust to the vehicle frame. The net result on acceleration is for both ends of the vehicle frame to be slightly elevated without pitching. The lifting force applied on acceleration through the torque arms 50 at the rear of the vehicle compensates for the shift of weight from front to rear wheels and relieves the rear spring assembly from carrying this additional weight. On brake application in a vehicle moving in a forward direction a downward thrust is exerted on the frame by torque arms 50 through the torque arm mountings on cross member 27.

Conventional brake backing plates, not shown, are rigidly attached to the rear wheel support and spindle members 45 thus transferring rotative forces applied to the brake backing plates directly to torque arms 50. The length of torque arms 50 is such that the downward force applied to frame cross member 27 during brake application while traveling in a forward direction somewhat exceeds the additional load imposed on the front wheels 10 by reason of the deceleration.

The net result during brake application while traveling in a forward direction is a slight simultaneous lowering of both ends of the vehicle. The chassis frame and body remain substantially parallel to the road surface and front end nose dive or pitching action is thus eliminated. During brake application while traveling in a reverse direction, both ends of the vehicle are elevated slightly, the rear by the upward lift of the torque arms 50 and the front due to the springing action on the front wheels supporting a reduced load.

The torque arms 50 also provide positive horizontal alignment of rear wheels 35 at all times. This is particularly important in independently suspended rear driving wheels due to the prolonged periods in which forces are exerted through the rear wheels to the road surface. Positive rear wheel alignment is very important in the handling of a vehicle since steering is very sensitive and adversely affected by any misalignment or looseness in the rear wheel mountings. Positive rear wheel alignment is provided by the torque arms 50 and associated arms 42 and 43, thus maintaining ease of rolling, reduced tire wear and superior handling stability.

In passing over road irregularities, the axis of the rear wheel 35 moves in an arc about the pivotal axis of turning 56 of torque arm 50 on frame cross member 27. Since axis 56, as shown in Fig. 2, is above the center of rear wheel 35, the rear wheel 35 moves slightly backward as it is elevated and forward as it is lowered. This backward component during upward movement of the rear wheel 35 allows the wheel, during impingement on a road obstacle, to move more directly away from the surface of contact with the obstacle resulting in less rapid acceleration of the wheel and supporting unsprung structure. This factor materially reduces the body shake or road shock at the rear of the vehicle in comparison with conventional vehicles in which the wheel moves in a substantially vertical direction.

As previously stated, torsion bars 29, 30 and 31 at each side of the vehicle apply load at the front end of the vehicle to the front road wheel 10 through lower suspension arm 12 and associated parts. These bars, extending to the rear of the vehicle, apply load to the rear wheels 35 by being torsionally deflected in opposition to the stress applied to the bars by the front wheels 10.

Referring in particular to Figs. 1, 4, 5 and 8, the rear upset square ends of the bars 29, 30 and 31 of each set and a fourth bar 33 are nested into a square socket 53 forming an integral part of an upright crank member or lever 57. Crank member 57 is rotatively mounted through rubber bearing 55 on tubular section 37b of the bracket 37. The axis of the torsion rod cluster comprising rods 29, 30, 31 and 33 is coincident with the axis of rotation of crank or lever 57.

A tension link 58 is pivotally attached at 58a to a boss 57a at the upper end of crank arm 57 by means of a suitable flexible bearing preferably formed of rubber. The outer end of each link 58 is pivotally secured at 58b through a suitable flexible bearing to a boss 42a at the lower end of the depending arm of each bell crank lever 42. From the above, it is apparent that an upward motion of a rear wheel 35 will impart through bell crank lever 42 and link 58 a rotative motion to crank arm 57 and coincidently a torsional deflection to torsion bars 29, 30, 31 and 33 in opposition to the stress or torsional deflection applied by an upward movement of a front wheel 10. Torsion bars 29, 30 and 31 on each side of the vehicle are installed with an initial torsion or stress to apply a desired load to the road wheels, thereby simultaneously applying vertical forces to the rear of the chassis frame through brackets 47 and at the front of the vehicle through brackets 16. Since the lifting force applied to each end of the frame is generally proportional to the stress in the torsion bars, it is apparent that any change in elevation of either a front or rear wheel produces corresponding simultaneous changes in lifting effort at both ends of the vehicle. Torsion bars 29, 30 and 31 at each side of the vehicle act as a mutual spring for a front and a rear wheel. The spring rates possible with this construction are extremely low as pitching of the vehicle is almost entirely eliminated. This construction alone contitutes a balanced suspension and is supplemented by additional spring means, namely, torsion bars 33, which serve to compensate for relative changes in elevation of the front and rear ends of the vehicle and thereby maintain the vehicle substantially level regardless of variations in static load applied thereto. Additional load placed at the front or rear will depress one end of the vehicle by applying increased twist to the mutual torsion bars. The increased twist is immediately apparent at the opposite end of the vehicle and results in an upward movement of the chassis frame or body.

Inasmuch as large concentrations of load are generally placed toward the rear end of automotive vehicles, it is desirable to compensate for this additional load and maintain a preferred riding height of the vehicle frame and body. By maintaining the normal riding height under all conditions of load, the maximum road wheel vertical travel is available for allowing the wheel to roll over road irregularities. Extremely soft spring rates may thus be used without sacrifice of load carrying capacity. For the purpose of load compensation, the fourth torsion rod 33 is fitted in socket 53 along with the mutual front and rear torsion bars 29, 30 and 31. As illustrated in Fig. 1, the torsion bar 33 on each side of the vehicle extends forwardly through suitable guide brackets on the chassis and terminates in a socket 59. Attached to the end of each socket 59 is a worm gear 60 driven by a worm 61 on a vertical shaft 62 to the upper end of which is attached a worm gear 63. The gear 63 is in turn driven by a worm 64 on the armature shaft of a reversible electric motor 65. The electric motor 65 is automatically actuated responsive to changes in load on the rear of the vehicle by a delayed action switch mechanism and wiring circuits, not shown herein but fully shown and described in my copending application, Serial No. 757,579, filed June 27, 1947.

Inasmuch as load compensating torsion rods 33 may be simultaneously deflected in either direction by the electric motor 65 and associated gear train, the lifting effort of bars 33 may either be added to the normal lifting effort of bars 29, 30 and 31 or placed in opposition thereto. In the latter case the combined lift of all bars may be reduced to the equivalent of two bars. It is therefore obvious that the rear end of the vehicle may have a potential lift for pay load equal to the rear end sprung weight.

The functions of the spring torsion bars described herein are threefold, i. e., (1) to provide a mutual spring between a front and a rear wheel, (2) to maintain the desired average front end riding height, and (3) to compensate for variable loads on the rear of the vehicle.

Any number of torsion bars may be used to accomplish each one of the above functions for a particular vehicle and they will preferably be selected as to size and resiliency so as to support the vehicle with the preferred axle to frame clearance, effective spring rate and load carrying capacity. The number of torsion bars in the present embodiments are understood to be shown merely for illustrative purposes as a greater or less number may be utilized without departing from the broader aspects of the invention.

I claim:

1. In a spring suspension for a vehicle having a frame and front and rear wheels, front and rear swinging lever arm means pivotally connected to the frame and connected to said wheels, longitudinal torsional spring means common to said wheels and connecting said front and rear lever arm means at the localities of the pivotal connections thereof to the frame and operative by said lever arm means to displace the front and rear of the frame in corresponding directions upon vertical motion of a front wheel or a rear wheel, compensating torsional spring means connected to one wheel for varying the spring resistance at one end of the frame relative to the opposite end of the frame, power operated means acting on said compensating spring means to vary the resistance thereof, and control means for said power operated means disposed adjacent said opposite end of the frame nearer the wheel at said end than the wheel at said first named end and responsive to relative vertical displacement of the front and rear of the frame.

2. In a spring suspension for a vehicle having a frame and front and rear wheels, front and rear swinging lever arm means pivotally connected to the frame and connected to said wheels, longitudinal torsional spring means common to said wheels and connecting said front and rear lever arm means at the localities of the pivotal connections thereof to the frame and operative by said lever arm means to displace the front and rear of the frame in corresponding directions upon vertical motion of a front wheel or a rear wheel, compensating torsional spring means connected to a rear wheel for varying the spring resistance at the rear of the frame relative to the front of the frame, and means disposed adjacent the forward portion of the frame nearer the front wheel than the rear wheel and responsive to relative vertical displacement of the front and rear of the frame and acting on said compensating spring means to vary the resistance thereof.

3. In a spring suspension for a vehicle having a frame and front and rear wheels at a side of the frame, front and rear swinging lever arm means pivotally connected to the frame and connected to said wheels, longitudinal torsional spring means common to said wheels and connecting said front and rear lever arm means at the localities of the pivotal connections thereof to the frame and operative by said lever arm means to displace the front and rear of the frame in corresponding directions upon vertical motion of a front wheel or a rear wheel, compensating spring means connected to one wheel for varying the spring resistance at one end of the frame relative to the opposite end of the frame, power operated means acting on said compensating spring means to vary the resistance thereof, and control means for said power operated means disposed adjacent said opposite end of the frame nearer the wheel at said end than the wheel at said first named end and responsive to relative vertical displacement of the front and rear of the frame.

4. In a spring suspension for a vehicle having a frame and front and rear wheels at a side of the frame, front and rear swinging lever arm means pivotally connected to the frame and connected to said wheels, longitudinal torsional spring means common to said wheels and connecting said front and rear lever arm means at the localities of the pivotal connections thereof to the frame and operative by said lever arm means to displace the front and rear of the frame in corresponding directions upon vertical motion of a front wheel or a rear wheel, compensating spring means connected to a rear wheel for varying the spring resistance at the rear of the frame relative to the front of the frame, and means disposed adjacent the forward portion of the frame nearer the front wheel than the rear wheel and responsive to relative vertical displacement of the front and rear of the frame and acting on said compensating spring means to vary the resistance thereof.

5. In a spring suspension for a vehicle having a frame and front and rear wheels, front and rear swinging lever arm means pivotally connected to the frame and connected to said wheels, longitudinal torsional spring means common to said wheels and connecting said front and rear lever arm means at the localities of the pivotal connections thereof to the frame and operative by said lever arm means to displace the front and rear of the frame in corresponding directions upon vertical motion of a front wheel or a rear wheel, compensating spring means connected to the rear wheel and being independent of the front wheel for varying the spring resistance at the rear of the frame relative to the front of the frame, and power operated means responsive to a change in elevation of the front of the frame relative to the rear of the frame and acting on said compensating spring means for varying the resistance thereof.

6. In a spring suspension for a vehicle having a frame and front and rear wheels, front and rear swinging lever arm means pivotally connected to the frame and connected to said wheels, longitudinal torsional spring means common to said wheels and connecting said front and rear lever arm means at the localities of the pivotal connections thereof to the frame and operative by said lever arm means to displace the front and rear of the frame in corresponding directions upon vertical motion of a front wheel or a rear wheel, compensating spring means connected to one wheel for varying the spring resistance at one end of the frame relative to the opposite end of the frame, and power operated means responsive to a change in elevation of said opposite end of the frame relative to said first named end and acting on said compensating spring means for varying the resistance thereof.

7. In a vehicle having a frame and front and rear wheels at a side of the frame, front and rear lever arm means connected to said wheels, a spring suspension common to said wheels and connecting said front and rear lever arm means and operative thereby to displace the front and rear of the frame in corresponding directions upon vertical motion of a front wheel or a rear wheel, compensating spring means connected to one wheel for varying the spring resistance at one end of the frame relative to the opposite end of the frame, and means disposed nearer the wheel at said opposite end of the frame than the wheel at said first named end and responsive to relative vertical displacement of the front and rear of the frame and acting on said compensating spring means to vary the resistance thereof.

8. In a vehicle having a frame and front and rear wheels at a side of the frame, front and rear lever arm means connected to said wheels, a spring suspension common to said wheels and connecting said front and rear lever arm means and operative thereby to displace the front and rear of the frame in corresponding directions upon vertical motion of a front wheel or a rear wheel, compensating spring means connected to the rear wheel for varying the spring resistance at the rear of the frame relative to the front of the frame, and means operatively connected to said compensating spring means and responsive to vertical displacement of the front of the frame relative to the rear of the frame and acting to deflect said compensating spring means thereby to vary the resistance thereof.

9. In a vehicle having a frame and front and rear wheels at a side of the frame, front and rear lever arm means connected to said wheels, a spring suspension common to said wheels and connecting said front and rear lever arm means and operative thereby to displace the front and rear of the frame in corresponding directions upon vertical motion of a front wheel or a rear wheel, compensating spring means connected to the rear wheel and being independent of the front wheel for varying the spring resistance at the rear of the frame relative to the front of the frame, and power operated means operatively connected to said compensating spring means and responsive to a change in elevation of the front of the frame relative to the rear of the frame and acting to deflect said compensating spring means thereby to vary the resistance thereof.

10. In a spring suspension for a vehicle having a frame and front and rear wheels at a side of the frame, front and rear swinging lever arm means pivotally connected to the frame and connected to said wheels, a spring suspension common to said wheels and connecting said front and rear lever arm means at the localities of the pivotal connections thereof to the frame and operative by said lever arm means to displace the front and rear of the frame in corresponding directions upon vertical motion of a front wheel or a rear wheel, compensating spring means connected to one wheel for varying the spring resistance at one end of the frame relative to the opposite end of the frame, and power operated means responsive to a change in elevation of said opposite end of the frame relative to said first named end and acting on said compensating spring means for varying the resistance thereof.

11. The structure as set forth in claim 5 wherein said power operated means comprises a reversible electric motor and said compensating spring means in conjunction with said torsional spring means being adapted to provide a greater spring rate at the rear wheel than at the front wheel.

12. The structure as set forth in claim 6 wherein said power operated means comprises a reversible electric motor and said compensating spring means in conjunction with said torsional spring means being adapted to provide a greater spring rate at said one wheel than at the opposite wheel.

13. The structure as set forth in claim 10 wherein said power operated means comprises a reversible electric motor and said compensating spring means in conjunction with said spring suspension being adapted to provide a greater spring rate at the said one wheel than at the opposite wheel.

14. The structure as set forth in claim 9 wherein said power operated means comprises a reversible electric motor and said compensating spring means in conjunction with said spring suspension being adapted to provide a greater spring rate at the rear wheel than at the front wheel.

15. In a vehicle having a frame and front and rear wheels at a side of the frame, swinging lever arm means connected to one wheel, upper and lower swinging lever arm means connected to the other wheel, longitudinal torsional spring means connected to said first named lever arm means, said upper lever arm means including a general upright lever arm connected adjacent its lower end to said spring means substantially at the pivotal axis of swinging of said lower lever arm means and a two arm lever pivotally connected to the frame, one arm of said two arm lever extending outwardly for connection to the wheel and the other arm extending downwardly and being operatively connected to the upper end of said upright lever arm, and compensating torsional spring means connected to the lever arm means for one wheel and being independent of the lever arm means for the other wheel for varying the spring resistance at one end of the frame relative to the other end.

16. In a vehicle having a frame and front and rear wheels at a side of the frame, swinging lever arm means connected to one wheel, upper and lower swinging lever arm means connected to the other wheel, longitudinal torsional spring means connected to said first named lever arm means, said upper lever arm means including a general upright lever arm connected adjacent its lower end to said spring means substantially at the pivotal axis of swinging of said lower lever arm means and a two arm lever pivotally connected to the frame, one arm of said two arm lever extending outwardly for connection to the wheel and the other arm extending downwardly and being operatively connected to the upper end of said upright lever arm, and additional torsional spring means connected to said first named lever arm means and being independent of said upper and lower lever arm means.

17. In a vehicle having a frame and front and rear wheels at a side of the frame, swinging lever arm means connected to one wheel, upper and lower swinging lever arm means connected to the other wheel, longitudinal torsional spring means connected to said first named lever arm means, said upper lever arm means including a general upright lever arm connected adjacent its lower end to said spring means and a two arm lever pivotally connected to the frame, one arm of said two arm lever extending outwardly for connection to the wheel and the other arm extending downwardly and being operatively connected to the upper end of said upright lever arm, and additional torsional spring means connected to said first named lever arm means and being independent of said upper and lower lever arm means.

18. In a spring suspension for a vehicle having a frame and front and rear wheels, lever arm means pivotally connected to the frame and connected to one wheel, upper and lower lever arm means pivotally connected to the frame and connected to the other wheel, a longitudinal spring suspension common to said wheels and connected to said first named lever arm means, said upper lever arm means including a lever pivotally connected to the frame and to said other wheel and having a depending arm and an upright lever connected to said spring suspension and operatively connected to said depending arm, and additional spring means connected to said first named lever arm means and being independent of said upper and lower lever arm means for varying the spring resistance at said one wheel relatively to the other wheel.

19. A structure as set forth in claim 18 in which said spring suspension and said spring means each includes torsional spring means.

20. A structure as set forth in claim 18 in which said depending arm and said upright lever each extends angularly with respect to the vertical.

21. A structure as set forth in claim 18 in which said spring means includes a torsion bar of less effective strength than said spring suspension.

22. In a vehicle having a frame and front and rear wheels at a side of the frame, swinging lever arm means connected to one wheel, upper and lower swinging lever arm means connected to the other wheel, longitudinal torsional spring means connected to said first named lever arm means, said upper lever arm means including a general upright lever arm connected adjacent its lower end to said spring means substantially at the pivotal axis of swinging of said lower lever arm means and a two arm lever pivotally connected to the frame and connecting the upper end of said upright lever arm to the wheel, load compensating spring means connected to one of said lever arm means, and means operatively connected to said compensating spring means and acting thereon to deflect the same in response to static load changes.

23. A structure as set forth in claim 22 wherein one arm of said two arm lever extends outwardly for connection to the wheel and the other arm extends downwardly and operatively connected to the upper end of said upright lever arm.

24. A structure as set forth in claim 10 in which said compensating spring means has less effective strength than said spring suspension and is effective in conjunction with said spring suspension to provide greater spring resistance at one wheel than at the other wheel.

WILLIAM D. ALLISON.

REFERENCES CITED

The following references are of record in the file of this patent:

UNITED STATES PATENTS

| Number | Name | Date |
|---|---|---|
| 1,396,549 | Beatty | Nov. 8, 1921 |
| 1,641,472 | Brown | Sept. 6, 1927 |
| 2,049,904 | Girling | Aug. 4, 1936 |
| 2,075,041 | Kliesrath | Mar. 30, 1937 |
| 2,083,381 | Hutchinson | June 8, 1937 |
| 2,097,438 | Best | Nov. 2, 1937 |
| 2,133,633 | Rabe et al. | Oct. 18, 1938 |
| 2,191,211 | Krotz | Feb. 20, 1940 |
| 2,194,964 | Willson | Mar. 26, 1940 |
| 2,346,123 | Willson | Apr. 4, 1944 |

FOREIGN PATENTS

| Number | Country | Date |
|---|---|---|
| 391,727 | Great Britain | May 4, 1933 |
| 457,089 | Great Britain | Nov. 20, 1936 |